United States Patent
Kurashima

(10) Patent No.: US 8,780,284 B2
(45) Date of Patent: Jul. 15, 2014

(54) CAPACITIVE INPUT DEVICE AND ELECTRO-OPTICAL APPARATUS WITH INPUT FUNCTION

(75) Inventor: Takeshi Kurashima, Nagano (JP)

(73) Assignee: Japan Display West Inc., Aichi-Ken (JP)

( * ) Notice: Subject to any disclaimer, the term of this patent is extended or adjusted under 35 U.S.C. 154(b) by 712 days.

(21) Appl. No.: 12/973,042

(22) Filed: Dec. 20, 2010

(65) Prior Publication Data

US 2011/0157762 A1      Jun. 30, 2011

(30) Foreign Application Priority Data

Dec. 28, 2009   (JP) ................................ P2009-297028

(51) Int. Cl.
*G02F 1/1335*   (2006.01)
*G02F 1/1345*   (2006.01)
*G06F 3/045*    (2006.01)

(52) U.S. Cl.
USPC ............................. 349/12; 349/150; 345/174

(58) Field of Classification Search
CPC ..... G02F 1/13338; G06F 3/044; G06F 3/041; G06F 2203/04112; G06F 2203/04107; G01R 27/26; H01G 5/00; H05K 13/00; H03K 17/975
USPC ............. 349/12, 139, 149–152; 345/173, 174
See application file for complete search history.

(56) References Cited

U.S. PATENT DOCUMENTS

| | | | |
|---|---|---|---|
| 7,030,860 B1 * | 4/2006 | Hsu et al. ........................ | 345/173 |
| 8,217,916 B2 * | 7/2012 | Anno .............................. | 345/174 |
| 2007/0252825 A1 * | 11/2007 | Nashiki et al. ................. | 345/173 |
| 2008/0062373 A1 * | 3/2008 | Kim et al. ...................... | 349/151 |
| 2010/0123681 A1 * | 5/2010 | Wu et al. ........................ | 345/174 |
| 2011/0090159 A1 * | 4/2011 | Kurashima ..................... | 345/173 |
| 2011/0095770 A1 * | 4/2011 | Kurashima ..................... | 324/679 |

FOREIGN PATENT DOCUMENTS

| | | |
|---|---|---|
| JP | 2009-086240 | 4/2009 |
| JP | 2009-220399 | 10/2009 |
| JP | 2003-511799 | 3/2011 |

OTHER PUBLICATIONS

Japanese Patent Office, Office Action issued in connection with Japanese Patent Application No. 2009-297028, dated Jun. 25, 2013. (2 pages).

* cited by examiner

*Primary Examiner* — Edward Glick
*Assistant Examiner* — David Chung
(74) *Attorney, Agent, or Firm* — K&L Gates LLP

(57) ABSTRACT

A capacitive input device includes: an input device substrate having a position detection electrode on a second surface side which is reverse to a first surface side on which an input operation is performed; and a shielding film which has a shield electrode layer on a base film and is adhered to the second surface side of the input device substrate by an adhesive layer.

1 Claim, 10 Drawing Sheets

CAPACITIVE INPUT DEVICE AND ELECTRO-OPTICAL APPARATUS WITH INPUT FUNCTION

CROSS REFERENCES TO RELATED APPLICATIONS

The present application claims priority Japanese Priority Patent Application JP 2009-297028 filed in the Japan Patent Office on Dec. 28, 2009, the entire contents of which are hereby incorporated by reference.

BACKGROUND

The present application relates to a capacitive input device for detecting an input position on the basis of a change in capacitance connected to an input position detection electrode, and an electro-optical apparatus with an input function which includes the capacitive input device.

In electronic equipment such as portable phones, car navigation systems, personal computers, ticket-vending machines, and banking terminals, there is electronic equipment in which an input device called a touch panel is disposed on the surface of an electro-optical panel such as a liquid crystal device to input information while referring to an image displayed on an image display region of the liquid crystal device. Among such input devices, a capacitive input device monitors capacitance connected to a plurality of input position detection electrodes formed on an input device substrate. Therefore, when a finger approaches any one of the plurality of input position detection electrodes, the capacitance in the input position detection electrode that the finger approaches is increased by capacitance that occurs between the finger and the input position detection electrode, so that the input position detection electrode that the finger approaches can be specified.

Since a change in capacitance connected to the input position detection electrode is detected, the capacitive input device is easily affected by electromagnetic noise penetrating from the reverse side to an input operation side of the input device substrate. Accordingly, there is proposed a method of providing an input position detection electrode on an input operation surface side of an input device substrate and providing a transparent shielding substrate or a substrate on which a shield electrode layer is formed so as to overlap a surface of the reverse side to the input operation surface side of the input device substrate (refer to Translation of PCT Application No. 2003-511799).

SUMMARY

Here, the inventors have examined a capacitive input device provided with an input position detection electrode on the reverse side to an input operation surface side of an input device substrate. In this configuration, the input device substrate itself can be used as a translucent cover, so that there is an advantage in that an additional translucent cover is not necessary for the input operation surface side of the input device substrate.

However, in the case where the input position detection electrode is provided on the reverse side to the input operation surface side of the input device substrate, when a shield electrode layer is provided on the reverse side to the input operation surface side of the input device substrate and electromagnetic shielding is performed, there is a problem in that a high capacitance is parasitized between the input position detection electrode and the shield electrode layer and thus detection sensitivity of an input position is degraded. Here, forming an insulating layer for covering the shield electrode layer on the input operation surface side of the input device substrate as an inorganic film or a photosensitive resin layer using a deposition method or a coating method to separate the input position detection electrode and the shield electrode layer may be considered. However, it is difficult to form the insulating layer which is thick enough to sufficiently reduce the parasitic capacitance on the input device substrate using the deposition method or the coating method.

It is desired to provide a capacitive input device and an electro-optical apparatus with an input function capable of preventing a large capacitance from being parasitized between an input position detection electrode and a shield electrode layer even in a case where the input position detection electrode and a shield electrode are provided on a reverse side to an input operation surface side of an input device substrate.

A capacitive input device according to an embodiment includes: an input device substrate having a position detection electrode on a second surface side which is reverse to a first surface side on which an input operation is performed; and a shielding film which has a shield electrode layer on a base film and is adhered to the second surface side of the input device substrate by an adhesive layer. According to an embodiment, the meaning of "adhesion" also includes the meaning of "pressure-sensitive adhesion". Therefore, the meaning of an "adhesive layer" according to an embodiment also includes the meaning of a "pressure-sensitive adhesive layer".

In the capacitive input device according to an embodiment, since the input position detection electrode is provided on the reverse side (the second surface side) to the input operation surface side (the first surface side) of the input device substrate, there is an advantage in that the input device substrate itself can be used as a translucent cover and the like. In addition, since the shielding film having the shield electrode layer is provided on the second surface side of the input device substrate, the input position detection electrode is hardly affected by electromagnetic noise. Here, the shielding film and the input device substrate are bonded to each other by the adhesive layer, and the adhesive layer is interposed between the shield electrode layer and the input device substrate. The adhesive layer can be easily thickened unlike an insulating film which is formed in the input device substrate by a deposition method or a coating method, so that the input position detection electrode and the shield electrode layer can be sufficiently separated from each other. Therefore, capacitance parasitized between the input position detection electrode and the shield electrode layer is small, thereby high sensitivity can be obtained.

According to an embodiment, the shielding film may be provided with the shield electrode layer on the reverse side to the side on which the input device substrate is positioned with respect to the base film. In this configuration, the adhesive layer and the base film are interposed between the shield electrode layer and the input position detection electrode of the input device substrate, and the adhesive layer and the base film can be easily thickened unlike the insulating film formed in the input device substrate by the deposition method or the coating method. Therefore, the input position detection electrode and the shield electrode layer can be separated from each other by a sufficient distance. Therefore, the capacitance parasitized between the input position detection electrode and the shield electrode layer is small, thereby high sensitivity can be obtained.

According to an embodiment, it is preferable that the sum of the thickness of the base film and the thickness of the adhesive layer be equal to or greater than 50 μm. With the thickness, the input position detection electrode and the shield electrode layer can be separated, so that sensitivity degradation caused by the capacitance parasitized between the input position detection electrode and the shield electrode layer can be prevented. In addition, it is preferable that the sum of the thickness of the base film and the thickness of the adhesive layer be in the range of 100 to 150 μm. When the sum of the thickness of the base film and the thickness of the adhesive layer is equal to or greater than 100 μm, the input position detection electrode and the shield electrode layer can be sufficiently separated, so that sensitivity degradation caused by the capacitance parasitized between the input position detection electrode and the shield electrode layer can be prevented. In addition, when the sum of the thickness of the base film and the thickness of the adhesive layer exceeds 150 μm, this does not contribute to an additional increase in sensitivity and the capacitive input device is unnecessarily thickened. Therefore, it is preferable that the sum of the thickness of the base film and the thickness of the adhesive layer be in the range of 100 to 150 μm.

According to an embodiment, it is preferable that the shielding film be a shielding film with an adhesive layer in which the adhesive layer is formed on one surface of the base film in advance and the shield electrode layer is formed on the other surface thereof in advance. In this configuration, the shielding film can be easily attached to the input device substrate.

According to an embodiment, it is preferable that the capacitive input device further include a flexible wiring board which partially overlaps with the second surface side of the input device substrate, the shielding film may include a main body portion overlapping with an input region where the position detection electrode is formed in the input device substrate, and a protruding portion protruding from the main body portion toward a position overlapping with the flexible wiring board, and a portion of the shield electrode layer formed in the protruding portion may be electrically connected to the flexible wiring board. In this configuration, there may be just a narrow region in which the shield electrode layer of the shielding film and the flexible wiring board are electrically connected to each other.

According to an embodiment, a plurality of position detection mounting terminals which are electrically connected to the flexible wiring board may be provided on the second surface side of the input device substrate, and the shielding film may have the protruding portions on both sides of a region where the plurality of the position detection mounting terminals are provided interposed therebetween. In this configuration, the shield electrode layer of the shielding film and the flexible wiring board can be reliably electrically connected to each other.

The capacitive input device applying an embodiment can be used for constituting an electro-optical apparatus with an input function. In this case, the position detection electrode, the input device substrate, the base film, the shield electrode layer, and the adhesive layer have translucent properties, and the electro-optical apparatus with an input function has a configuration in which an electro-optical panel for image generation is disposed on the reverse side to the side on which the input device substrate is positioned with respect to the shielding film. The electro-optical apparatus with an input function is used for electronic equipment such as portable phones, car navigation systems, personal computers, ticket-vending machines, and banking terminals.

Additional features and advantages are described herein, and will be apparent from the following Detailed Description and the figures.

DETAILED DESCRIPTION

Figure 1A:
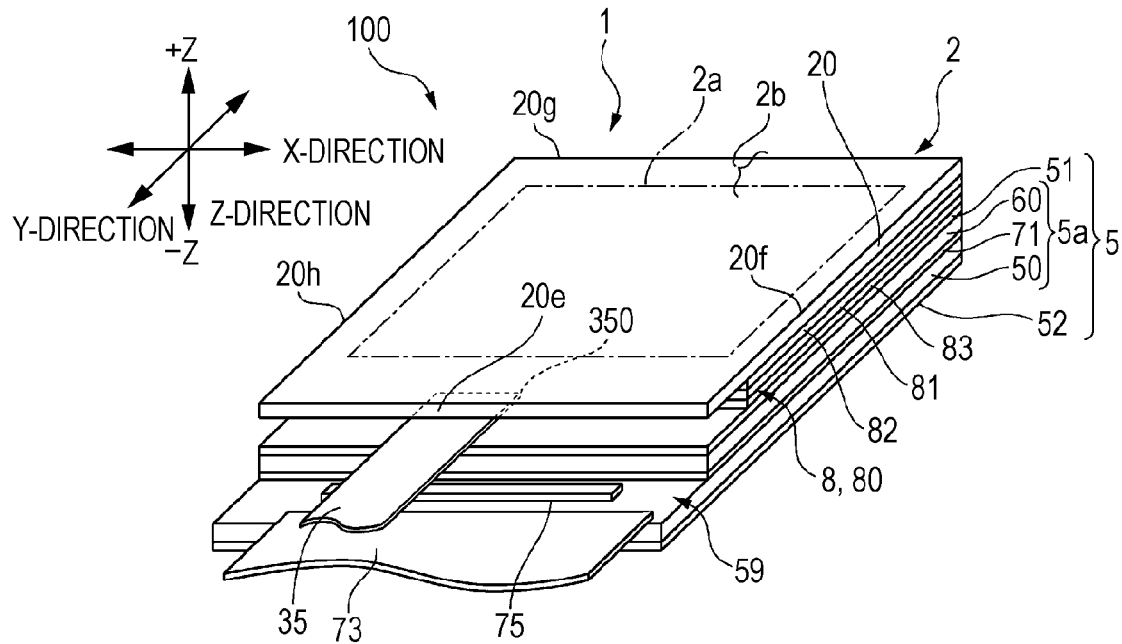
FIGS. 1A and 1B are diagrams illustrating an electro-optical apparatus with an input function according to a first embodiment.

Embodiments of the present application will be described below in detail with reference to the drawings.

Exemplary embodiments of the application will be described with reference to the accompanying drawings. In the drawings referred to in the following description, in order for each layer and each member to have recognizable sizes in the drawings, the scales for the layers and the members are different. In addition, in the following description, directions which are orthogonal to each other are represented by an X-axis (X-direction), a Y-axis (Y-direction), and a Z-axis (Z-direction), and an input operation side in the Z-direction is referred to as +Z and the reverse side to the input operation side is referred to as −Z.

First Embodiment

Entire Configuration of Electro-Optical Apparatus with Input Function

Figure 1B:
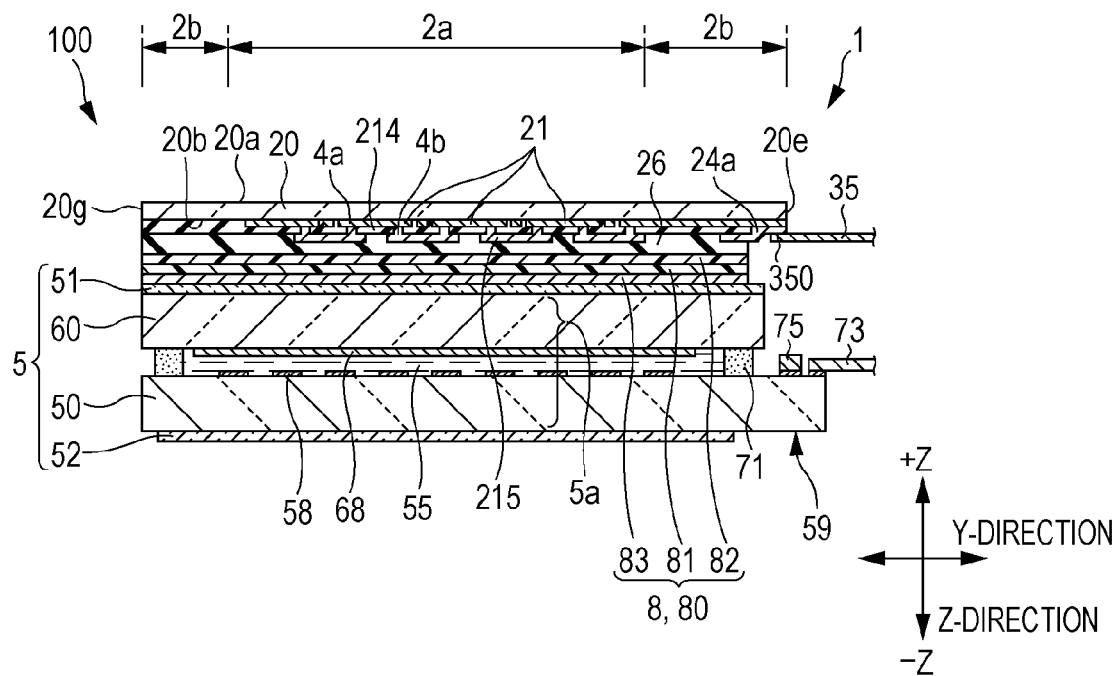

FIGS. 1A and 1B are diagrams illustrating an electro-optical apparatus with an input function according to a first embodiment. FIG. 1A is a diagram schematically illustrating the outer appearance of the electro-optical apparatus with an input function, and FIG. 1B is a diagram schematically illustrating a cross-sectional configuration of the electro-optical apparatus with an input function.

In FIGS. 1A and 1B, the electro-optical apparatus 100 with an input function according to this embodiment mainly includes an image generating device 5 made of a liquid crystal device or the like and a capacitive input device 1 which is disposed to overlap with a surface of the image generating device 5 on a display light exiting side. The capacitive input device 1 includes an input panel 2, and the image generating device 5 includes a liquid crystal panel as an electro-optical panel 5a (display panel). The input panel 2 and the electro-optical panel 5a both have rectangular planar shapes, and a central region of the input panel 2 in plan view is an input region 2a. In addition, a region of the electro-optical panel 5a which overlaps with the input region 2a in plan view is an image formation region.

In the capacitive input device 1, among four end portions 20e to 20h of an input device substrate 20 used for the input panel 2, a side on which the end portion 20e is positioned is connected with a flexible wiring board 35, and a side on which the end portion 20e is positioned in the electro-optical panel 5a is connected with a flexible wiring board 73. In the capacitive input device 1, a control IC (not shown) for detecting an input operation in the input panel 2 is electrically connected to the input device substrate 20 via the flexible wiring board 35.

In this embodiment, a translucent shielding film 8 is disposed between the input panel 2 and the electro-optical panel 5a, and the shielding film 8 has a function of preventing electromagnetic noise from penetrating from the reverse side (the electro-optical panel 5a) to the input operation side of the input panel 2. The configuration of the shielding film 8 will be described later.

The image generating device 5 is a transmissive or transflective active-matrix liquid crystal display device, and, a backlight unit (not shown) is disposed on the electro-optical panel 5a on the reverse side (the reverse side to the display light exiting side) to the side on which the input panel 2 is disposed. The backlight unit includes, for example, a translucent light guiding plate which is disposed on the electro-optical panel 5a to overlap with the reverse side to the side on which the input panel 2 is disposed, and a light source such as a light emitting diode for emitting white light or the like toward a side end portion of the light guiding plate. Light emitted by the light source is incident from the side end portion of the light guiding plate and then propagates inside the light guiding plate to exit toward the electro-optical panel 5a. A sheet-shaped optical member such as a light scattering sheet or a prism sheet may be disposed between the light guiding plate and the electro-optical panel 5a.

In the image generating device 5, a first polarizing plate 51 is provided to overlap with the display light exit side of the electro-optical panel 5a and a second polarizing plate 52 is provided to overlap with the reverse side of the electro-optical panel 5a. The first and second polarizing plates 51 and 52 are adhered to the electro-optical panel 5a by a translucent acrylic resin-based adhesive (not shown) or the like. In addition, the first polarizing plate 51 and the shielding film 8 are adhered to each other by a translucent acrylic resin-based adhesive (not shown) or the like. The electro-optical panel 5a includes a translucent counter substrate 60 disposed on the display light exit side (the input operation side) and a translucent element substrate 50 which is provided so as to be opposite to the counter substrate 60. The counter substrate 60 and the element substrate 50 are bonded to each other by a seal material 71 having a rectangular frame shape, and a liquid crystal layer 55 is held in a region enclosed by the seal material 71 between the counter substrate 60 and the element substrate 50. On a surface of the element substrate 50 opposite to the counter substrate 60, a plurality of pixel electrodes 58 is formed of a translucent conductive film such as an ITO (Indium Tin Oxide) film or an IZO (Indium Zinc Oxide) film, and on a surface of the counter substrate 60 opposite to the element substrate 50, a common electrode 68 is formed of a translucent conductive film such as an ITO film. Moreover, in a case where the image generation device 5 is in an IPS (In Plane Switching) mode or in an FFS (Fringe Field Switching) mode, the common electrode 68 is provided on the side of the element substrate 50. In addition, there may be a case where the element substrate 50 is disposed on the display light exit side of the counter substrate 60. A driving IC 75 is subjected to COG mounting to be mounted on a projection region 59 of the element substrate 50 projecting from the edge of the counter substrate 60, and the flexible wiring board 73 is connected to the projection region 59. Furthermore, there may be a case where a switching element on the element substrate 50 and a drive circuit are simultaneously formed on the element substrate 50.

Configuration of Capacitive Input Device 1

In the capacitive input device 1, the input panel 2 includes the translucent input device substrate 20 made of a glass plate or a plastic plate, and in this embodiment, a glass substrate is used as the input device substrate 20. In addition, in the case where the input device substrate 20 is made of a plastic material, as the plastic material, heat-resistant translucent sheets made of PET (polyethylene terephthalate), PC (polycarbonate), PES (polyethersulfone), PI (polyimide), cyclic olefin resins such as polynorbornene, or the like may be used.

A substrate surface of the input device substrate 20 positioned on the input operation side is a first surface 20a, and a substrate surface thereof positioned on the reverse side to the input operation side is a second surface 20b. In this embodiment, on the second surface 20b of the input device substrate 20, as viewed from the input device substrate 20 in a direction from a lower layer side to an upper layer side, a translucent lower layer side conductive film 4a, a translucent interlayer insulating film 214, a translucent upper layer side conductive film 4b, and a translucent surface protection film 26 are formed in this order, and of the lower layer side conductive film 4a and the upper layer side conductive film 4b, an input position detection electrode 21 is formed by the lower layer side conductive film 4a. In addition, a relay electrode 215 is formed by the upper layer side conductive film 4b. At the end portion 20e of the input device substrate 20, a position detection mounting terminal 24a is formed on the second surface 20b, and the flexible wiring board 35 is electrically connected to the position detection mounting terminal 24a.

In the first surface 20a or the second surface 20b of the input device substrate 20, on an outer region 2b corresponding to the outer periphery of the input region 2a, a light shielding layer (not shown) having an insulating property may be printed, and a region surrounded by the light shielding layer is the input region 2a. The light shielding layer overlaps with an outer region of the electro-optical panel 5a and blocks light leaking from the light source of the image generating device 5 or an end portion of the light guiding plate.

Configuration of Input Device Substrate 20

Figure 2A:
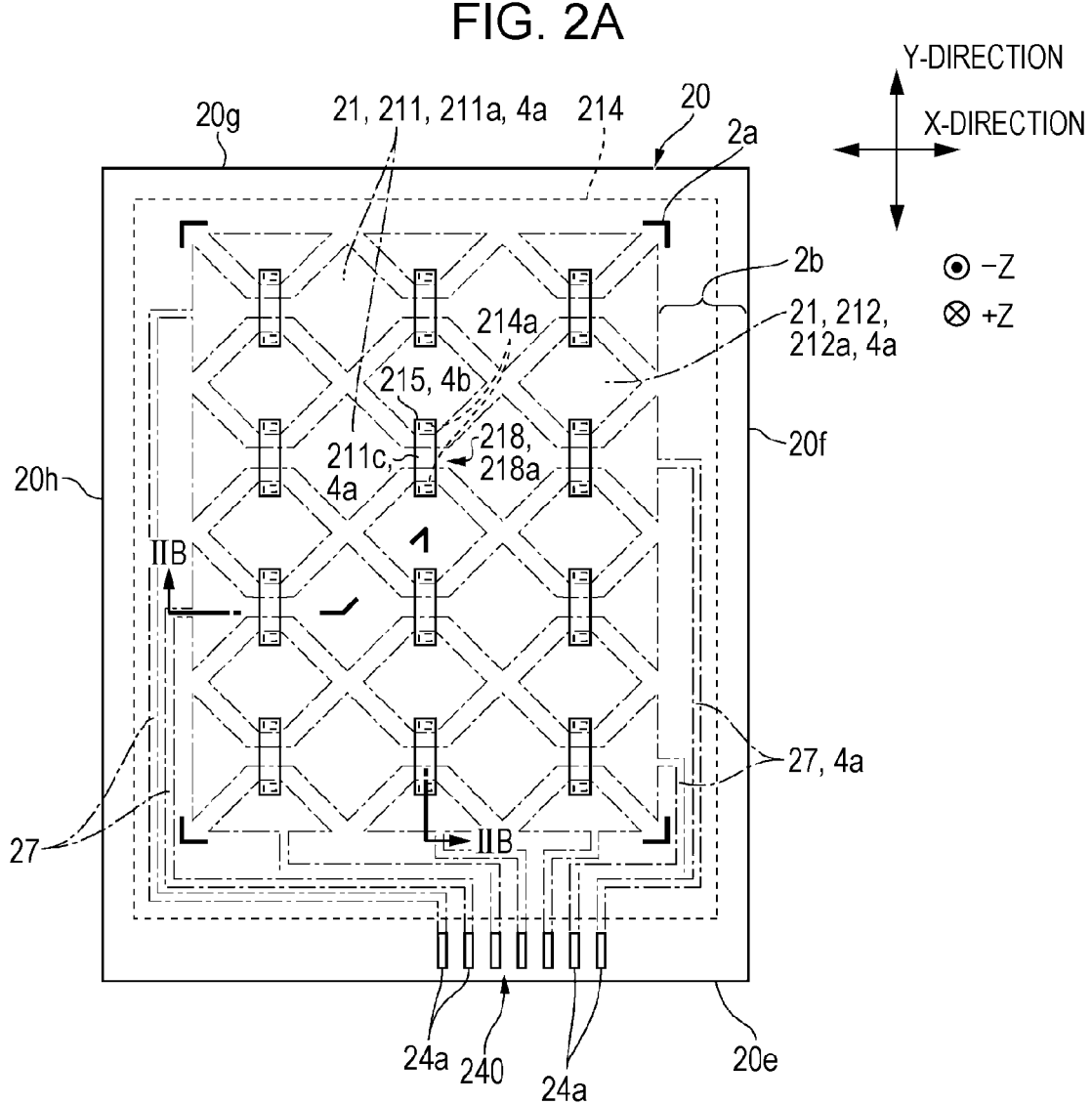
FIGS. 2A and 2B are diagrams illustrating the configuration of an input device substrate of a capacitive input device according to the first embodiment.
Figure 2B:
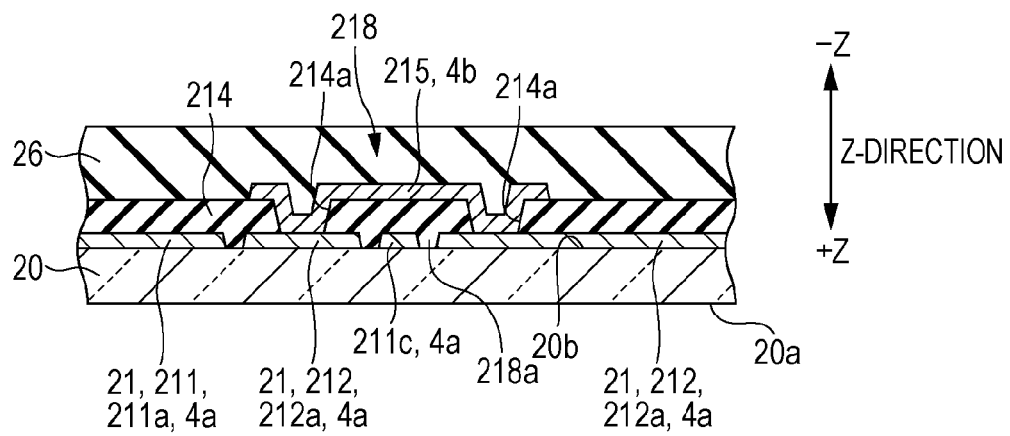

FIGS. 2A and 2B are diagrams illustrating the configuration of the input device substrate 20 of the capacitive input device 1 according to the first embodiment. FIG. 2A is a plan view of the input device substrate 20, and FIG. 2B is a cross-sectional view taken along the line IIB-IIB thereof. In addition, in FIG. 2B, unlike in FIGS. 1A and 1B, the input operation side (the first surface 20a of the input device substrate 20) is illustrated to be on the lower side. In FIG. 2A, the lower layer side conductive film 4a is shown by a dot-dashed line, the interlayer insulating film 214 is shown by a dotted line, and the upper layer side conductive film 4b is shown by a solid line. Moreover, in FIG. 2A, positions of angular portions of the input region 2a are shown by "L"-shaped marks.

As illustrated in FIGS. 2A and 2B, in the capacitive input device 1 according to this embodiment, on the second surface 20b side of the input device substrate 20, as viewed from the input device substrate 20 in the direction from the lower layer side to the upper layer side, the lower layer side conductive film 4a, the interlayer insulating film 214, the upper layer side conductive film 4b, and the surface protection film 26 are formed in this order. In this embodiment, the lower layer side conductive film 4a and the upper layer side conductive film 4b are translucent conductive films such as an ITO film or an IZO film having a thickness of 10 to 40 nm, and the interlayer insulating film 214 and the surface protection film 26 are translucent insulating films made of a silicon oxide film or a photosensitive resin having a thickness of 200 to 600 nm. There may be a case where a translucent base protection film made of a silicon oxide film is formed on the entire second surface 20b of the input device substrate 20. In this case, on the base protection film, the lower layer side conductive film 4a, the interlayer insulating film 214, the upper layer side conductive film 4b, and the surface protection film 26 are laminated in this order. In order to form the capacitive input device 1, the lower layer side conductive film 4a, the interlayer insulating film 214, the upper layer side conductive film 4b are formed in predetermined patterns.

The lower layer side conductive film 4a is, first, formed as a plurality of rhombic regions on the input region 2a, and the rhombic regions form pad portions 211a and 212a (large area portions) of the input position detection electrode 21 (a first input position detection electrode 211 and a second input position detection electrode 212). The pad portions 211a and 212a are alternately arranged in the X-direction and the Y-direction. With regard to the plurality of the pad portions 211a, the pad portions 211a which are adjacent in the X-direction (first direction) are connected to each other via connection portions 211c, and the pad portions 211a and the connection portions 211c constitute the first input position detection electrode 211 extending in the X-direction. In addition, although the plurality of the pad portions 212a constitute the second input position detection electrode 212 extending in the Y-direction (second direction), an interruption portion 218a is provided between the pad portions 212a adjacent in the Y-direction (at a portion overlapping with the connection portion 211c).

In addition, the lower layer side conductive film 4a is formed in the outer region 2b of the input region 2a as a plurality of wirings 27 extending from the input position detection electrode 21 (the first input position detection electrode 211 and the second input position detection electrodes 212), and is formed as a plurality of the position detection mounting terminals 24a in the vicinity of the end portion 20e.

The interlayer insulating film 214 is formed on the entire input region 2a. In addition, the interlayer insulating film 214 is also formed on the outer region 2b of the input region 2a. The interlayer insulating film 214 is provided with contact holes 214a, and the contact holes 214a are formed at positions overlapping with end portions of the pad portion 212a facing each other via the interruption portion 218a.

The upper layer side conductive film 4b is formed as the relay electrode 215 at a region overlapping with the contact hole 214a in the input region 2a. In addition, the upper layer side conductive film 4b is also formed in formation regions of the wiring 27 and the position detection mounting terminal 24a, and the wiring 27 and the position detection mounting terminal 24a are configured as a double-layer structure of the lower layer side conductive film 4a and the upper layer side conductive film 4b. Moreover, in the wiring 27, there may be a case where a metal layer made of chrome, silver, aluminum, an alloy of silver and aluminum, or the like is formed as an interlayer between the lower layer side conductive film 4a and the upper layer side conductive film 4b or on the upper layer side conductive film 4b. When this multi-layer structure is employed, wiring resistance of the wiring 27 can be reduced.

When the lower layer side conductive film 4a, the interlayer insulating film 214, and the upper layer side conductive film 4b configured as described above are overlapped, the plurality of the input position detection electrodes 21 are formed inside the input region 2a. In this embodiment, the input position detection electrodes 21 include a plurality of rows of the first input position detection electrodes 211 extending in the X-direction and a plurality of rows of the second input position detection electrodes 212 extending in the Y-direction. The input position detection electrodes 21 (the first input position detection electrodes 211 and the second input position detection electrode 212) are formed by the lower layer side conductive film 4a of the lower and upper layer side conductive films 4a and 4b and become the same layer. Accordingly, on the second surface 20b of the input device substrate 20, there are a plurality of intersection portions 218 of the first input position detection electrodes 211 and the second input position detection electrodes 212. Here, even in the intersection portions 218, the first input position detection electrodes 211 are connected and extend in the X-direction by the connection portions 211c formed of the lower layer side conductive film 4a, and on the other hand, the intersection portions 218 of the second input position detection electrodes 212 are configured as the interruption portions 218a. However, at the intersection portion 218 on the interlayer insulating film 214, the relay electrode 215 formed of the upper layer side conductive film 4b is formed, and the relay electrode 215 electrically connects the adjacent pad portions 212a via the contact hole 214a of the interlayer insulating film 214 and the interruption portion 218a. Accordingly, the second input position detection electrodes 212 are electrically connected in the Y-direction. Moreover, the relay electrode 215 overlaps with the connection portion 211c via the interlayer insulating film 214 and thus there is no concern about short-circuiting.

Each of the first and second input position detection electrodes 211 and 212 configured as described above includes the pad portions 211a and 212a with large areas in regions interposed between the intersection portions 218. The connection portion 211c of the first input position detection electrode 211 positioned at the intersection portion 218 has a narrow shape with a smaller width than the pad portions 211a and 212a. In addition, the relay electrode 215 also has a narrow shape with a smaller width than the pad portions 211a and 212a.

Shield Structure

Figure 3A:
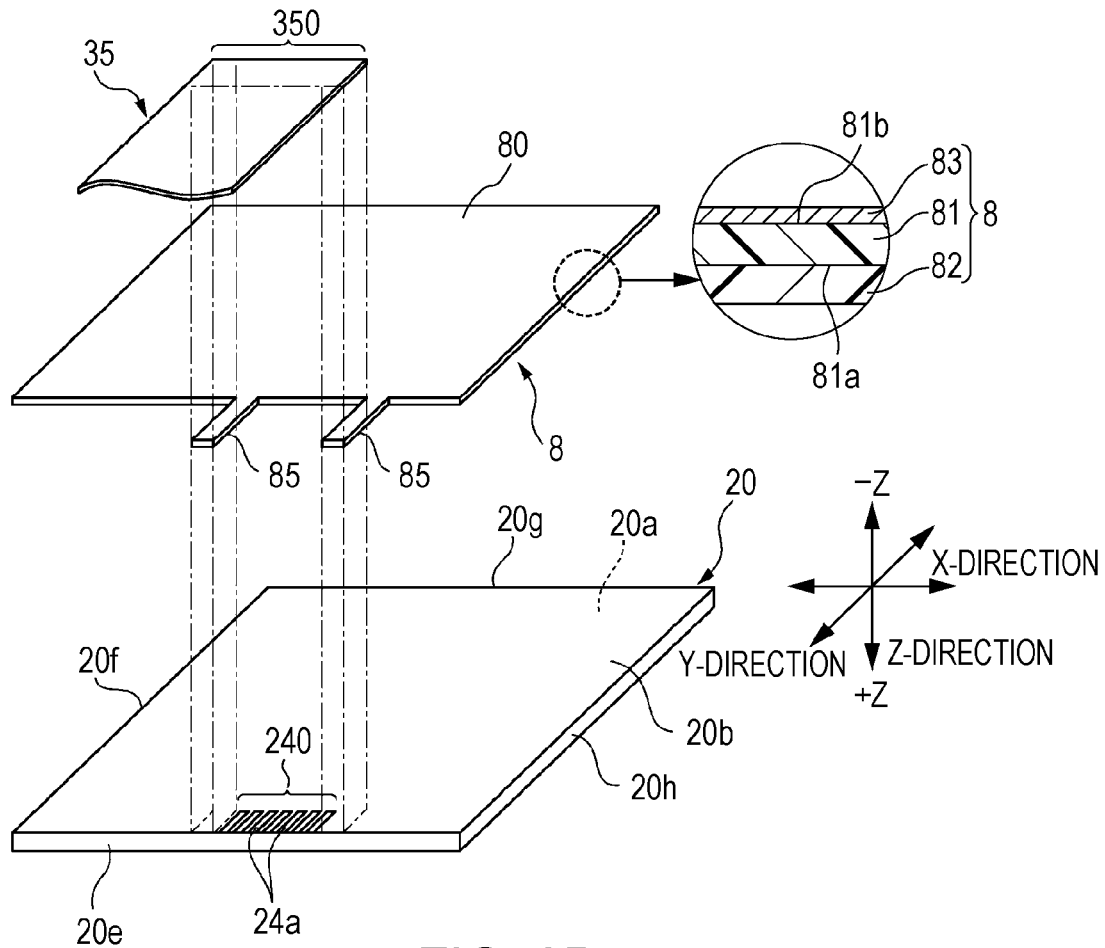
FIGS. 3A and 3B are diagrams illustrating the capacitive input device according to the first embodiment.
Figure 3B:
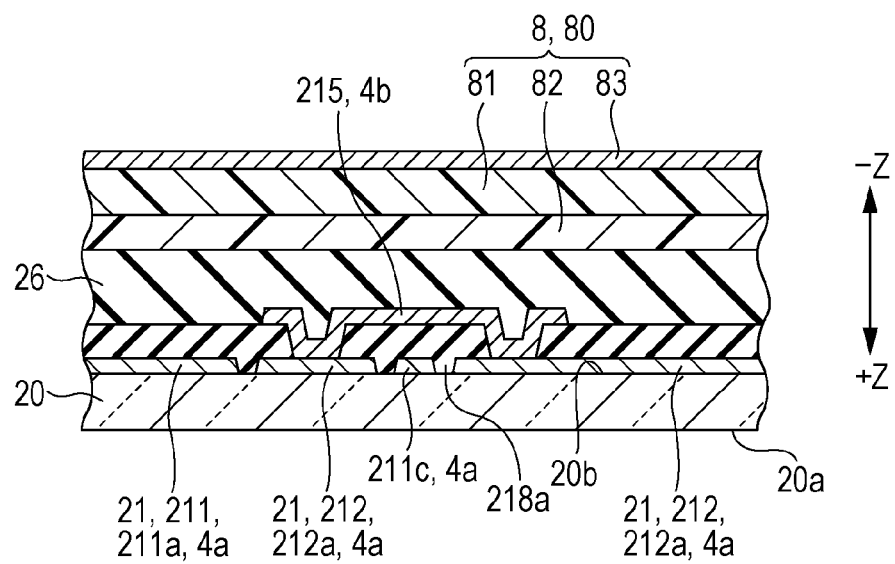

A shield structure of the input device substrate 20 (the input panel 2) will be described with reference to FIGS. 1A to 3B. FIGS. 3A and 3B are diagrams illustrating the capacitive input device 1 according to the first embodiment. FIG. 3A is an exploded perspective view of the capacitive input device 1, and FIG. 3B is a cross-sectional view illustrating a state where the shielding film 8 overlaps with the input device substrate 20. In addition, in FIGS. 3A and 3B, as in FIG. 2B, the input operation side (the first surface 20a of the input device substrate 20) is illustrated to be on the lower side. In addition, in FIG. 3A, illustration of the input position detection electrode 21, the wiring 27, and the like is omitted.

As illustrated in FIGS. 1A to 3B, in the capacitive input device 1 according to this embodiment, in the second surface 20b of the input device substrate 20, the plurality of the position detection mounting terminals 24a as well as the input position detection electrode 21 and the wiring 27 (not shown in FIGS. 3A and 3B) are formed. In addition, the translucent shielding film 8 is disposed to overlap the second surface 20b side of the input device substrate 20.

The shielding film 8 includes a translucent base film 81 having a size to overlap with the input device substrate 20, a translucent adhesive layer 82 formed on the entirety of one surface side 81a of the base film 81 on which the input device substrate 20 is positioned, and a translucent shield electrode layer 83 formed on the entirety of the other surface side 81b of the base film 81 which is the reverse side to the side on which the input device substrate 20 is positioned. Here, the shielding film 8 is a shielding film with an adhesive layer in which the adhesive layer 82 is formed in advance on the one surface side 81a of the base film 81 and the shield electrode layer 83 is formed in advance on the other surface side 81b of the base film 81. In the shielding film 8, the base film 81 is made of a resin film having an insulating property such as PET, and the adhesive layer 82 is made of a pressure-sensitive adhesive layer having an insulating property such as an acrylic resin-based pressure-sensitive adhesive. The shield electrode layer 83 is made of a translucent conductive film such as ITO or IZO.

The shielding film 8 is adhered and fixed to the second surface 20b side of the input device substrate 20 by the adhesive layer 82. In addition, the shield electrode layer 83 has applied to it a shield potential via the flexible wiring board 35 as described later with reference to FIGS. 4A to 5D. Therefore, as illustrated in FIGS. 1A and 1B, the shield electrode layer 83 of the shielding film 8 is interposed between the input panel 2 (the input device substrate 20) and the electro-optical panel 5a, and the shield electrode layer 83 prevents electromagnetic noise from penetrating from the reverse side (the electro-optical panel 5a) of the input operation side in the input panel 2.

Here, the shielding film 8 is adhered and fixed to the second surface 20b side of the input device substrate 20 by the adhesive layer 82, and has the shield electrode layer 83 on the reverse side to the side on which the input device substrate 20 is positioned with respect to the base film 81. Therefore, between the shield electrode layer 83 and the input position detection electrode 21 of the input device substrate 20, the adhesive layer 82 and the base film 81 are interposed as well as the surface protection film 26. Moreover, the adhesive layer 82 and the base film 81 can be easily thickened unlike the surface protection film 26 which is formed in the input device substrate 20 by the deposition method or the coating method.

More specifically, the upper limit of the thickness of the surface protection film 26 is in the range of 1.5 to 6 μm even if the surface protection film 26 is formed as thick as possible. However, the base film 81 can be thickened to 25 to 188 μm and the adhesive layer 82 can be thickened to 25 μm. Accordingly, the sum of the thickness of the base film 81 and the thickness of the adhesive layer 82 is equal to or greater than 50 μm and thus is significantly higher than the thickness of the surface protection film 26. According to this embodiment, the thickness of the base film 81 is in the range of 75 to 125 μm, and the thickness of the adhesive layer 82 is 25 μm. Accordingly, according to this embodiment, the sum of the thickness of the base film 81 and the thickness of the adhesive layer 82 are set to be in the range of 100 to 150 μm Therefore, the input position detection electrode 21 and the shield electrode layer 83 can be separated by a sufficient distance, so that capacitance parasitized between the input position detection electrode 21 and the shield electrode layer 83 is small. Consequently, in the capacitive input device 1 according to this embodiment, sensitivity degradation caused by the capacitance parasitized between the input position detection electrode 21 and the shield electrode layer 83 does not occur, so that high sensitivity of the capacitive input device 1 can be achieved.

Structure of Electrical Connection Between Shield Electrode Layer 83 and Flexible Wiring Board 35

In addition to FIGS. 1A to 3B, with reference to FIGS. 4A to 5D, the structure of electrical connection between the input device substrate 20, the flexible wiring board 35, and the shielding film 8 will be described.

Figure 4A:
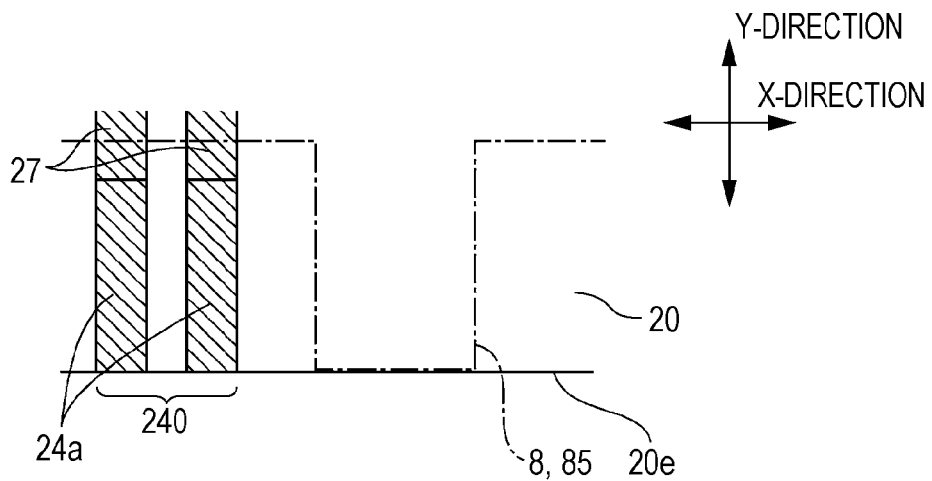
FIGS. 4A to 4C are diagrams illustrating members which are electrically connected in the capacitive input device according to the first embodiment.
Figure 4B:
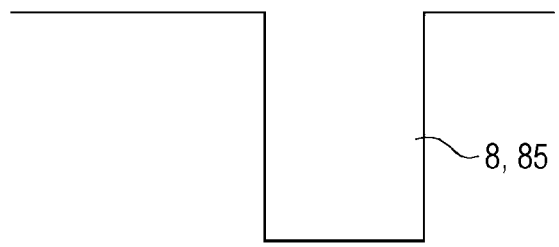
Figure 4C:
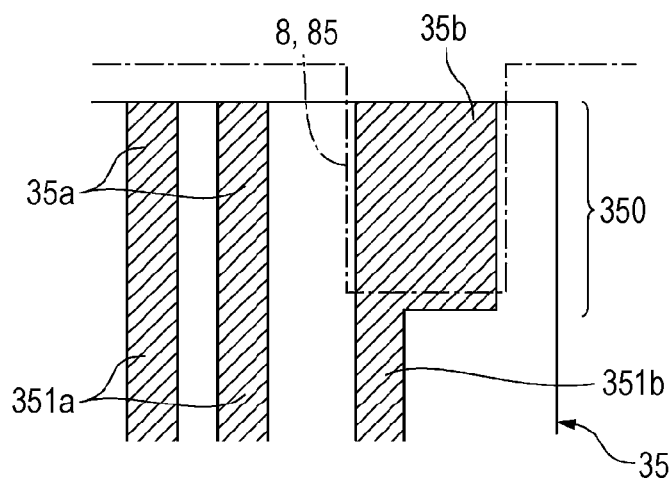

FIGS. 4A to 4C are diagrams illustrating members which are electrically connected in the capacitive input device 1 according to the first embodiment. FIG. 4A is an enlarged view illustrating a planar configuration of a terminal arrangement region of the input device substrate 20, FIG. 4B is an enlarged view illustrating a planar configuration of a protruding portion of the shielding film 8, and FIG. 4C is an enlarged view illustrating a planar configuration of the flexible wiring board 35. In addition, in FIGS. 4A and 4C, a region overlapping with the shielding film 8 is shown by a dot-dashed line.

Figure 5A:
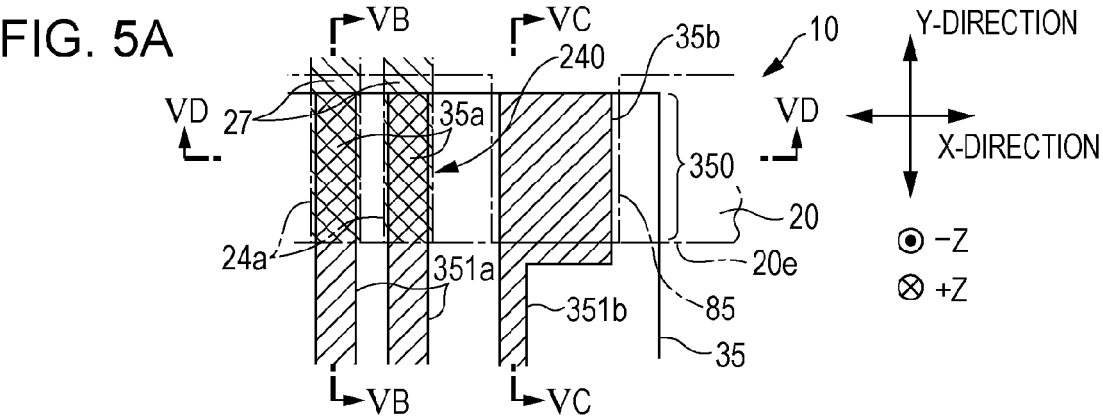
FIGS. 5A to 5D are diagrams illustrating the periphery of a portion of the input device substrate to which a flexible wiring board is mounted in the capacitive input device according to the first embodiment.
Figure 5B:
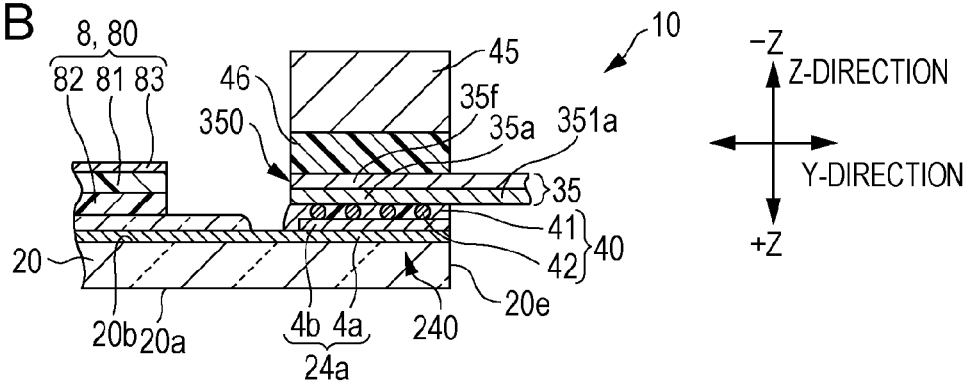
Figure 5C:
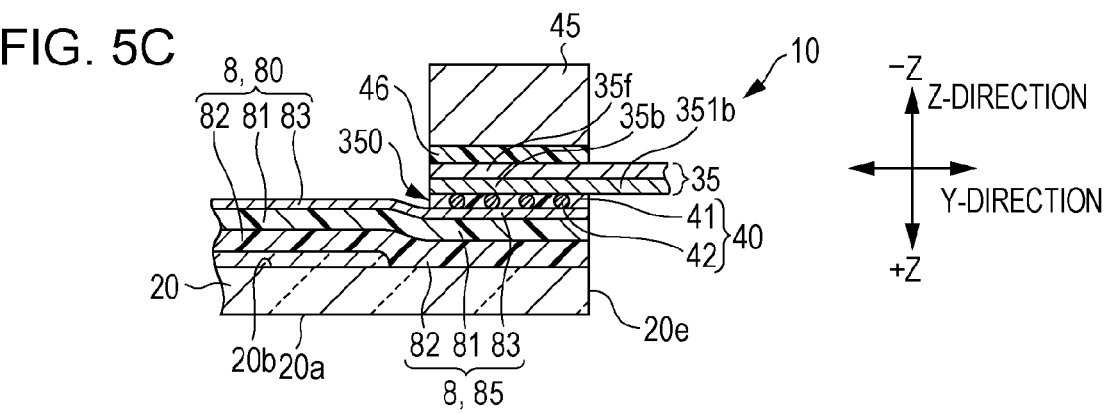
Figure 5D:
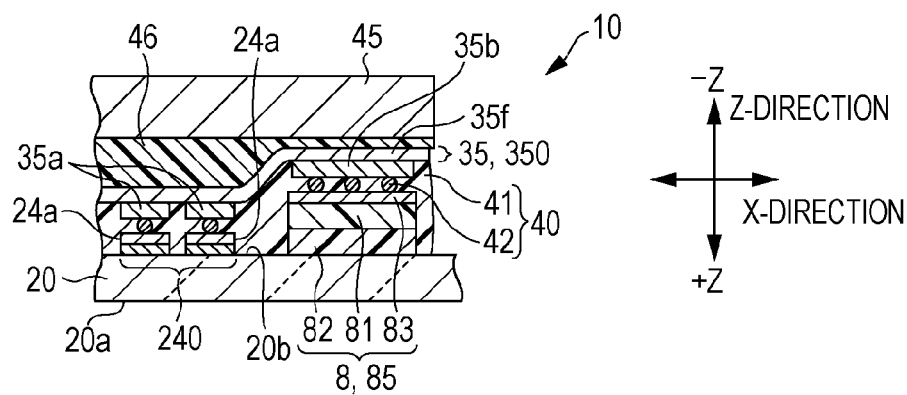

FIGS. 5A to 5D are diagrams illustrating the periphery of a portion of the input device substrate 20 to which a flexible wiring board 35 is mounted in the capacitive input device 1 according to the first embodiment. FIG. 5A is a plan view of a mounting portion of the input device substrate 20, FIG. 5B is a cross-sectional view taken along the line VB-VB, FIG. 5C is a cross-sectional view taken along the line VC-VC and FIG. 5D is a cross-sectional view taken along the line VD-VD. In addition, in FIGS. 5B, 5C, and 5D, a pressure-bonding head used for mounting and the like are illustrated. In FIG. 5A, components of the flexible wiring board 35 are shown by a solid line, components of the input device substrate 20 are shown by a dot-dashed line, and the shielding film 8 is shown by a dot-dot-dashed line. In FIGS. 5A to 5D, as in FIG. 2B, the input operation side (the first surface 20a of the input device substrate 20) is illustrated to be on the lower side.

As illustrated in FIGS. 1A and 1B, FIG. 2A, FIGS. 3A and 3B, FIG. 4A, and FIGS. 5A to 5D, on the second surface 20b of the input device substrate 20, a terminal arrangement region 240 is configured in which the plurality of the position detection mounting terminals 24a are arranged along the end portion 20e. In FIGS. 1A and 1B, FIGS. 3A and 3B, FIG. 4C, and FIGS. 5A to 5D, the flexible wiring board 35 has an overlapping portion 350 which overlaps with the terminal arrangement region 240 of the input device substrate 20 and both side regions thereof. In the overlapping portion 350, terminals 35a are formed in regions overlapping with the position detection mounting terminals 24a and the terminal 35a is made of end portions of wirings 351a formed on a base film 35f of the flexible wiring board 35. When the flexible wiring board 35 configured as described above is subjected to a mounting process described later, the position detection mounting terminal 24a and the terminal 35a of the flexible wiring board 35 are electrically connected to each other.

In this embodiment, as described later with reference to FIGS. 3A and 3B, FIGS. 4A to 4C, and FIGS. 5A to 5D, the flexible wiring board 35 is used to apply the shield potential to the shield electrode layer 83 of the shielding film 8. Specifically, first, the shielding film 8 includes a main body portion 80 having a large area which overlaps with the input region 2a of the input device substrate 20 and two protruding portions 85 extending from the main body portion 80 in band shapes, and both the main body portion 80 and the protruding portions 85 are provided with the adhesive layer 82 and the shield electrode layer 83. The two protruding portions 85 protrude to portions overlapping with the flexible wiring board 35 and overlap with both side regions of the terminal arrangement region 240 of the position detection mounting terminal 24*a* on the second surface 20*b* of the input device substrate 20. In this state, in the protruding portions 85, the adhesive film 82 is positioned on the side on which the input device substrate 20 is positioned, and the shield electrode layer 83 is positioned on the reverse side to the side on which the input device substrate 20 is positioned. Accordingly, the protruding portions 85 is adhered and fixed to the second surface 20*b* of the input device substrate 20 by the adhesive layer 82. In addition, the main body portion 80 of the input device substrate 20 is adhered and fixed to the second surface 20*b* of the input device substrate 20 by the adhesive layer 82.

Here, on the second surface 20*b* of the input device substrate 20, mounting terminals are not formed in both side regions (the regions overlapping with the protruding portions 85 of the shielding film 8) of the terminal arrangement region 240 of the position detection mounting terminals 24*a*. Contrary to this, in the flexible wiring board 35, terminals 35*b* are formed on the regions (the regions overlapping with the protruding portions 85 of the shielding film 8) overlapping with both side regions of the terminal arrangement region 240 of the position detection mounting terminals 24*a*. The terminals 35*b* are made of end portions of wirings 351*b* formed on the base film 35*f* of the flexible wiring board 35.

Using the input device substrate 20, the flexible wiring board 35, and the shielding film 8 configured as described above, as illustrated in FIGS. 5B, 5C, and 5D, the terminal 35*a* of the flexible wiring board 35 and the position detection mounting terminal 24*a* of the input device substrate 20 can be electrically connected to each other with an anisotropic conductive material 40 by performing a mounting process described later. In addition, the terminal 35*b* of the flexible wiring board 35 and the shield electrode layer 83 provided in the protruding portions 85 of the shielding film 8 can be electrically connected to each other with the anisotropic conductive material 40.

Production Method and Mounting Process of Capacitive Input Device 1

With reference to FIGS. 3A and 3B, FIGS. 4A to 4C, and FIGS. 5A to 5D, in a method of producing the capacitive input device 1 according to this embodiment, a process will be described for mounting the flexible wiring board 35 to the input device substrate 20, and a structure of electrical connection between the shielding film 8 and the flexible wiring board 35 in the capacitive input device 1 according to this embodiment will be described.

When the capacitive input device 1 according to this embodiment is produced, in the mounting process, first, as illustrated in FIGS. 3A and 3B, the main body portion 80 of the shielding film 8 is adhered and fixed to the second surface 20*b* of the input device substrate 20 by the adhesive layer 82, and the protruding portions 85 thereof are adhered and fixed to the second surface 20*b* of the input device substrate 20 by the adhesive layer 82.

Next, as illustrated in FIGS. 5B, 5C, and 5D, the anisotropic conductive material 40 in a liquid state is applied to cover the terminal arrangement region 240 of the input device substrate 20 and the protruding portions 85 of the shielding film 8. Alternatively, the anisotropic conductive material 40 in a sheet form is overlapped to cover the terminal arrangement region 240 of the input device substrate 20 and the protruding portions 85. The anisotropic conductive material 40 has a configuration in which conductive particles 42 are distributed in a resin 41. Next, the end portion (the overlapping portion 350) of the flexible wiring board 35 is overlapped to cover the terminal arrangement region 240 of the input device substrate 20 and the protruding portions 85 via the anisotropic conductive material 40.

Next, the flexible wiring board 35 is pressed against the input device substrate 20 by the pressure-bonding head 45 while heating the flexible wiring board 35. At this time, an elastic member 46 made of a fluororesin-based sheet or the like is inserted between the pressure-bonding head 45 and the flexible wiring board 35. Next, the anisotropic conductive material 40 is solidified so as to allow the flexible wiring board 35 to be fixed to the terminal arrangement region 240 of the input device substrate 20 by the anisotropic conductive material 40, and the flexible wiring board 35 and the protruding portions 85 are fixed to each other by the anisotropic conductive material 40. Thereafter, the pressure-bonding head 45 and the elastic member 46 are removed.

As a result, the terminal 35*a* of the flexible wiring board 35 and the position detection mounting terminal 24*a* of the input device substrate 20 can be electrically connected to each other with the anisotropic conductive material 40. In addition, the terminal 35*b* of the flexible wiring board 35 and the shield electrode layer 83 provided in the protruding portions 85 of the shielding film 8 can be electrically connected to each other with the anisotropic conductive material 40. Therefore, the entire shield electrode layer 83 of the shielding film 8 can be electrically connected to the terminal 35*b* and the wiring 351*b* of the flexible wiring board 35 via the protruding portions 85. Therefore, the shield potential can be applied to the shield electrode layer 83 via the flexible wiring board 35.

Operations Including Input Position Detection

As illustrated in FIG. 1B, in the capacitive input device 1 according to this embodiment, the flexible wiring board 35 is connected to the position detection mounting terminal 24*a* of the input panel 2. In this state, position detection signals in pulse form are sequentially output to the input device substrate 20 via the flexible wiring board 35. Therefore, in a case where capacitance is not parasitized in the input position detection electrode 21, the same or substantially the same waveform as that of the output position detection signal in the pulse form is detected by the input device substrate 20.

Contrary to this, if capacitance is parasitized in the input position detection electrode 21, there is distortion of the waveform caused by the parasitic capacitance, so that whether or not capacitance is parasitized in the input position detection electrode 21 can be detected. Therefore, in this embodiment, the position detection signals are sequentially output to the plurality of the input position detection electrodes 21 to monitor capacitance connected to each of the input position detection electrodes 21. Therefore, when a finger approaches one of the plurality of the input position detection electrodes 21, the capacitance of the one input position detection electrode 21 that the finger approaches is increased by capacitance that occurs between the electrode and the finger, so that the electrode that the finger approaches can be specified.

When the position detection operation is performed, the shield potential is output to the shielding film 8 via the flexible wiring board 35. Accordingly, in the input panel 2 (the input device substrate 20), even if electromagnetic noise penetrates the input panel 2 from the electro-optical panel 5*a* positioned on the reverse side to the input operation side, the electromagnetic noise is blocked by the shield electrode layer 83 of the shielding film 8. Therefore, malfunction of the input panel 2 caused by the electromagnetic noise rarely occurs.

Main Effects of this Embodiment

As described above, in the capacitive input device 1 and the electro-optical apparatus 100 with an input function according to this embodiment, the input position detection electrode 21 is provided on the reverse side (the second surface 20*b* side) to the input operation surface side (the first surface 20*a* side) of the input device substrate 20, so that there is an advantage in that the input device substrate 20 itself can be used as a translucent cover.

In addition, since the shielding film 8 having the shield electrode layer 83 is disposed to overlap on the second surface 20*b* side of the input device substrate 20, the input position detection electrode 21 is hardly affected by electromagnetic noise. Here, the shielding film 8 and the input device substrate 20 are bonded to each other by the adhesive layer 82, and the adhesive layer 82 is interposed between the shield electrode layer 83 and the input device substrate 20. The adhesive layer 82 can be easily thickened unlike the surface protection film 26 which is formed in the input device substrate 20 by the deposition method or the coating method, so that the input position detection electrode 21 and the shield electrode layer 83 can be separated from each other.

Further, the shielding film 8 has the shield electrode layer 83 on the reverse side to the side on which the input device substrate 20 is positioned with respect to the base film 81. Accordingly, the adhesive layer 82 and the base film 81 are interposed between the shield electrode layer 83 and the input position detection electrode 21 of the input device substrate 20, so that the input position detection electrode 21 and the shield electrode layer 83 can be separated by a sufficient distance of 50 μm or greater. In addition, in this embodiment, since the input position detection electrode 21 (the pad portion) is formed by the lower layer side conductive film 4*a*, the interlayer insulating film 214 is also interposed between the input position detection electrode 21 and the shield electrode layer 83. Accordingly, the capacitance parasitized between the input position detection electrode 21 and the shield electrode layer 83 can be sufficiently reduced, so that high position detection sensitivity can be obtained.

In addition, in this embodiment, the sum of the thickness of the base film 81 and the thickness of the adhesive layer 82 is set to be in the range of 100 to 150 μm. When the sum of the thickness of the base film 81 and the thickness of the adhesive layer 82 is equal to or greater than 100 μm, the input position detection electrode 21 and the shield electrode layer 83 can be sufficiently separated from each other, so that sensitivity degradation caused by the capacitance parasitized between the input position detection electrode 21 and the shield electrode layer 83 can be reliably prevented. Moreover, when the sum of the thickness of the base film 81 and the thickness of the adhesive layer 82 exceeds 150 μm, this does not contribute to a further increase in sensitivity and the capacitive input device 1 is unnecessarily thickened. Here, in this embodiment, since the sum of the thickness of the base film 81 and the thickness of the adhesive layer 82 is set to be in the range of 100 to 150 μm, the sensitivity degradation caused by the capacitance parasitized between the input position detection electrode 21 and the shield electrode layer 83 can be prevented without unnecessarily thickening the capacitive input device 1.

In addition, in this embodiment, the shielding film 8 has the protruding portions 85 protruding toward the position overlapping with the flexible wiring board 35, and the portion of the shield electrode layer 83 provided in the protruding portions 85 is electrically connected to the flexible wiring board 35. Accordingly, there may be just a narrow region in which the shield electrode layer 83 of the shielding film 8 and the flexible wiring board 35 are electrically connected to each other. In addition, the shielding film 8 can be disposed to avoid the terminal arrangement region 240, so that the electrical connection between the position detection mounting terminal 24*a* and the flexible wiring board 35 may not be interrupted by the shielding film 8. Moreover, since the shielding film 8 has the two protruding portions 85, which protrude toward both sides of the terminal arrangement region 240 in which the plurality of the position detection mounting terminals 24*a*, is provided, the shield electrode layer 83 of the shielding film 8 and the flexible wiring board 35 can be reliably electrically connected to each other.

In addition, in this embodiment, the flexible wiring board 35 is pressed by the pressure-bonding head 45 against the input device substrate 20 and the elastic member 46 is interposed between the flexible wiring board 35 and the pressure-bonding head 45 and between the protruding portions 85 and the pressure-bonding head 45 when the electrical connection between the position detection mounting terminal 24*a* and the flexible wiring board 35 and the electrical connection between the shield electrode layer 83 in the protruding portions 85 and the flexible wiring board 35 are simultaneously performed. Accordingly, on the second surface 20*b* side of the input device substrate 20, even in the case where the thickness of the shielding film 8 and the thickness of the position detection mounting terminal 24*a* of the input device substrate 20 are different from each other, the difference between the thicknesses can be absorbed by deformation of the elastic member 46. Therefore, when the flexible wiring board 35 is electrically connected to the position detection mounting terminal 24*a* of the input device substrate 20, the flexible wiring board 35 can be reliably electrically connected to the protruding portions 85 of the shielding film 8.

In addition, the shielding film 8 is provided in advance with the adhesive layer 82 to adhere the shielding film 8 to the second surface 20*b* side of the input device substrate 20, so that the protruding portions 85 can be adhered to the first surface 20*a* side of the input device substrate 20 by the adhesive layer 82. Accordingly, when the flexible wiring board 35 is electrically connected to the protruding portions 85 of the shielding film 8, the protruding portions 85 of the shielding film 8 can be fixed to the input device substrate 20, so that the flexible wiring board 35 can be electrically connected to the protruding portions 85 of the shielding film 8 easily and reliably.

Second Embodiment

Entire Configuration of Electro-Optical Apparatus with Input Function

Figure 6A:
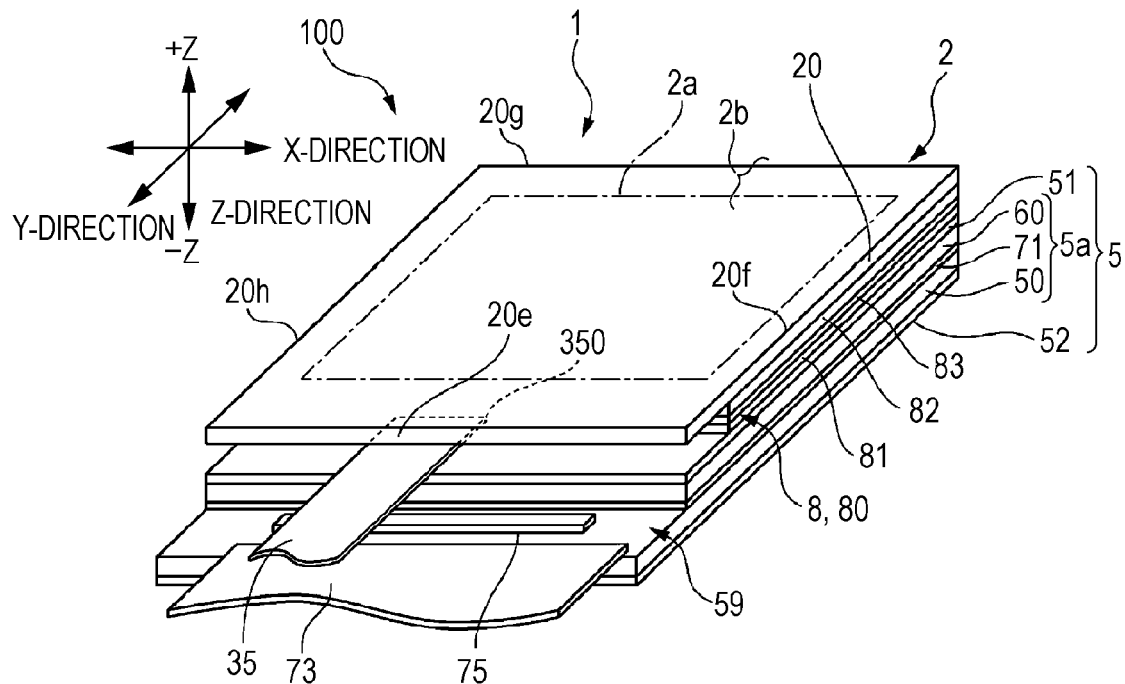
FIGS. 6A and 6B are diagrams illustrating an electro-optical apparatus with an input function according to a second embodiment.
Figure 6B:
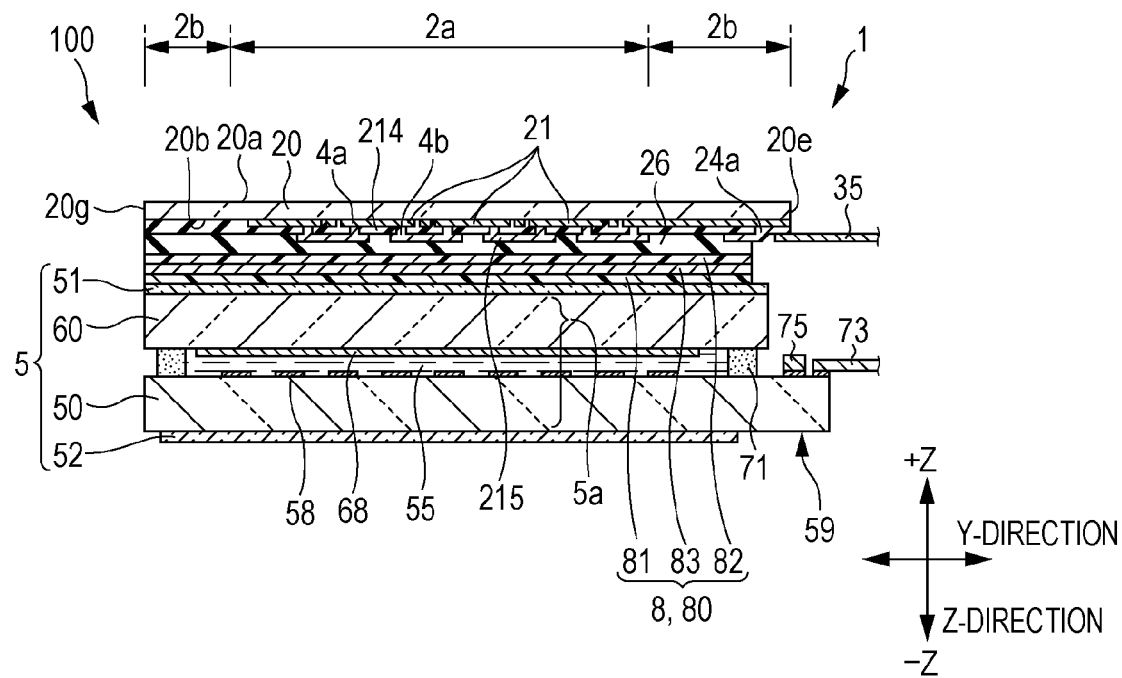

FIGS. 6A and 6B are diagrams illustrating an electro-optical apparatus with an input function according to a second embodiment. FIG. 6A is a diagram schematically illustrating the outer appearance of the electro-optical apparatus with an input function, and FIG. 6B is a diagram schematically illustrating the cross-sectional configuration of the electro-optical apparatus with an input function. Moreover, the basic configuration of this embodiment is similar to that of the first embodiment, so that like elements are denoted by like reference numerals and detailed description thereof will be omitted.

As illustrated in FIGS. 6A and 6B, the electro-optical apparatus 100 with an input function according to this embodiment also includes, as in the first embodiment, an image generating device 5 made of a liquid crystal device or the like and a capacitive input device 1 which is disposed to overlap with a surface of the image generating device 5 on a display light exiting side.

In the capacitive input device 1, an input panel 2 includes a translucent input device substrate 20 made of a glass plate, a plastic plate, or the like, and in this embodiment, a glass substrate is used as the input device substrate 20. In the input device substrate 20, on a second surface 20b side on the reverse side to a first surface 20a positioned on an input operation side, as viewed from the input device substrate 20 in a direction from a lower layer side to an upper layer side, a lower layer side conductive film 4a, an interlayer insulating film 214, an upper layer side conductive film 4b, and a surface protection film 26 are formed in this order, and an input position detection electrode 21 is formed by the lower layer side conductive film 4a. In addition, at an end portion 20e of the input device substrate 20, a position detection mounting terminal 24a is formed on the second surface 20b, and a flexible wiring board 35 is electrically connected to the position detection mounting terminal 24a.

Shield Structure

Figure 7A:
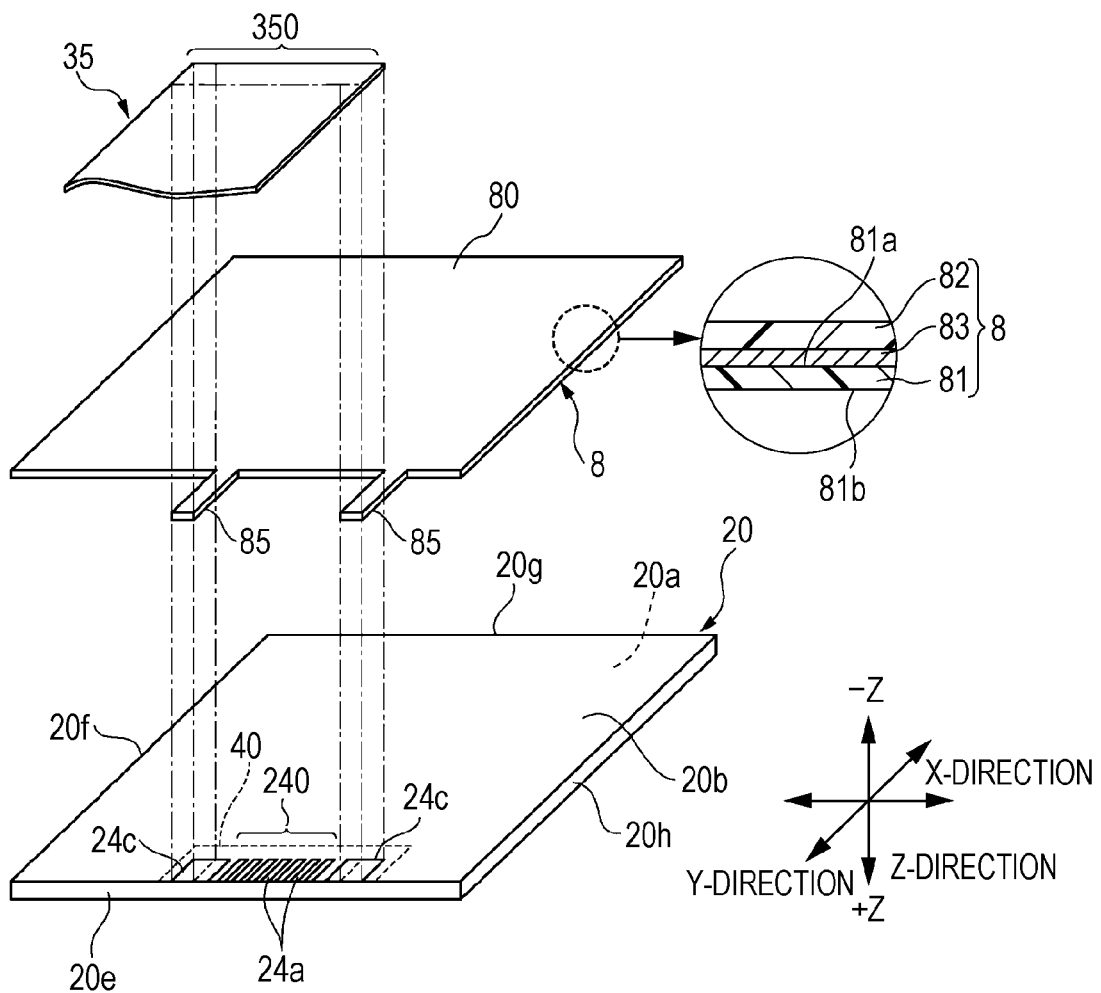
FIGS. 7A and 7B are diagrams illustrating a capacitive input device according to the second embodiment.
Figure 7B:
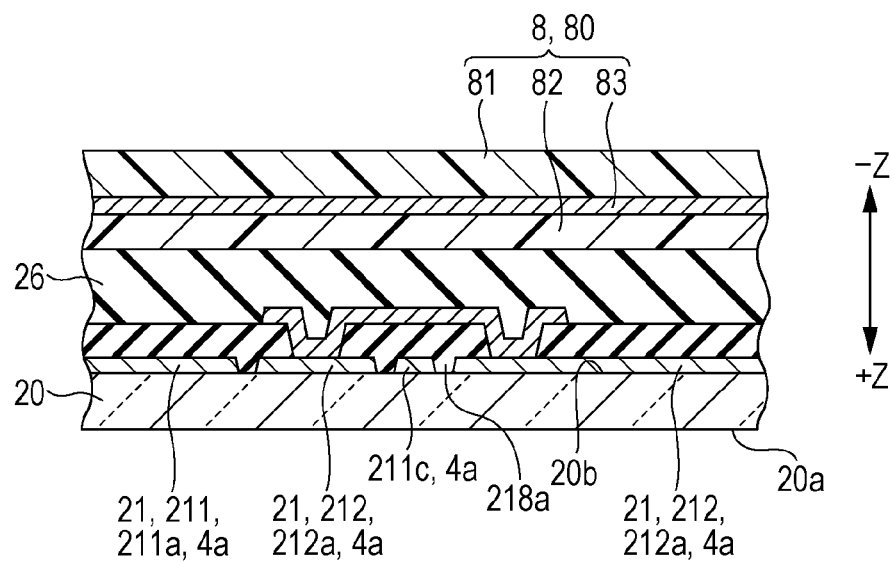

FIGS. 7A and 7B are diagrams illustrating the capacitive input device 1 according to the second embodiment. FIG. 7A is an exploded perspective view of the capacitive input device 1, and FIG. 7B is a cross-sectional view illustrating a state where a shielding film 8 overlaps with the input device substrate 20. In addition, even in FIGS. 7A and 7B, as in FIG. 2B, the input operation side (the first surface 20a of the input device substrate 20) is illustrated to be on the lower side. In FIGS. 7A and 7B, illustration of the input position detection electrode 21, wirings 27, and the like is omitted.

As illustrated in FIGS. 6A to 7B, in the capacitive input device 1 according to this embodiment, as in the first embodiment, the translucent shielding film 8 is disposed to overlap with the second surface 20b side of the input device substrate 20.

In this embodiment, unlike the first embodiment, the shielding film 8 has a structure in which a shield electrode layer 83 and an adhesive layer 82 are connected in this order to one surface side 81a of a base film 81 on which the input device substrate 20 is positioned, and a shield electrode layer 83 is not formed on the other surface side 81b of the base film 81. The base film 81 is made of a translucent resin film such as PET, and the adhesive film 82 is made of a translucent pressure-sensitive adhesive layer such as an acrylic resin-based pressure-sensitive adhesive. The shield electrode layer 83 is made of a translucent conductive film such as ITO or IZO.

The shielding film 8 is adhered and fixed to the second surface 20b side of the input device substrate 20 by the adhesive layer 82. In addition, the shield electrode layer 83 has applied to it a shield potential via the flexible wiring board 35 as described later with reference to FIGS. 8A to 9D. Therefore, as illustrated in FIGS. 6A and 6B, the shield electrode layer 83 of the shielding film 8 is interposed between the input panel 2 (the input device substrate 20) and an electro-optical panel 5a, and thus the shield electrode layer 83 prevents electromagnetic noise from penetrating from the reverse side (the electro-optical panel 5a) of the input operation side in the input panel 2.

Here, the shielding film 8 is adhered and fixed to the second surface 20b side of the input device substrate 20 by the adhesive layer 82, so that the adhesive layer 82 as well as the surface protection film 26 are interposed between the shield electrode layer 83 and the input position detection electrode 21 of the input device substrate 20. The adhesive layer 82 can be easily thickened unlike the surface protection film 26 which is formed in the input device substrate 20 by the deposition method or the coating method.

That is, the upper limit of the thickness of the surface protection film 26 is in the range of 1.5 to 6 μm even if the surface protection film 26 is formed as thick as possible. However, the adhesive layer 82 can be thickened to 25 μm or greater. Therefore, the input position detection electrode 21 and the shield electrode layer 83 can be separated by a sufficient distance, so that capacitance parasitized between the input position detection electrode 21 and the shield electrode layer 83 is small. Consequently, in the capacitive input device 1 according to this embodiment, there is no sensitivity degradation caused by the capacitance parasitized between the input position detection electrode 21 and the shield electrode layer 83, so that high sensitivity of the capacitive input device 1 can be achieved.

Structure of Electrical Connection Between Shield Electrode Layer 83 and Flexible Wiring Board 35

Figure 8A:
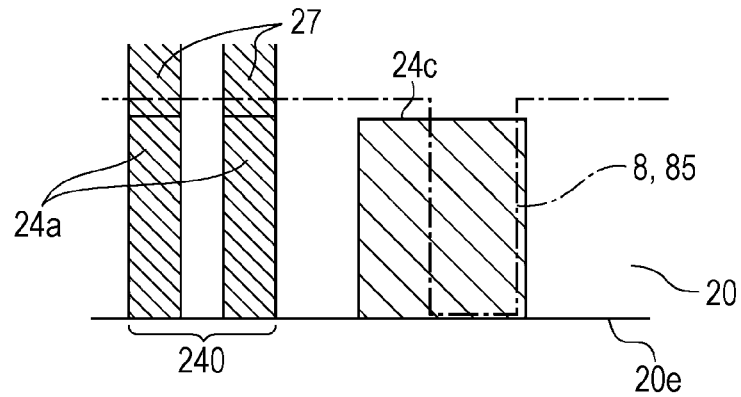
FIGS. 8A to 8C are diagrams illustrating members which are electrically connected in the capacitive input device according to the second embodiment.
Figure 8B:
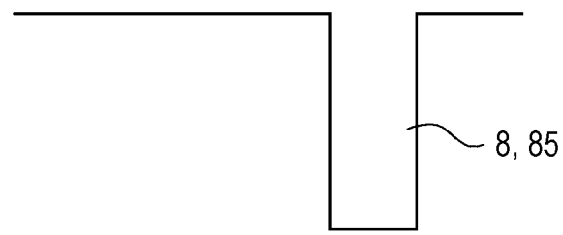
Figure 8C:
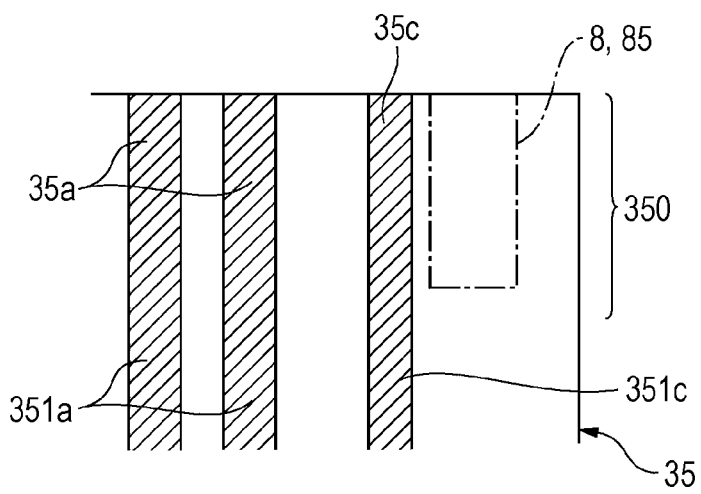

FIGS. 8A to 8C are diagrams illustrating members which are electrically connected in the capacitive input device 1 according to a third embodiment. FIG. 8A is an enlarged view illustrating a planar configuration of a terminal arrangement region of the input device substrate 20, FIG. 8B is an enlarged view illustrating a planar configuration of a protruding portion of the shielding film 8, and FIG. 8C is an enlarged view illustrating a planar configuration of the flexible wiring board 35. In addition, in FIGS. 8A and 8C, a region overlapping with the protruding portion of the shielding film 8 is shown by a dot-dashed line.

Figure 9A:
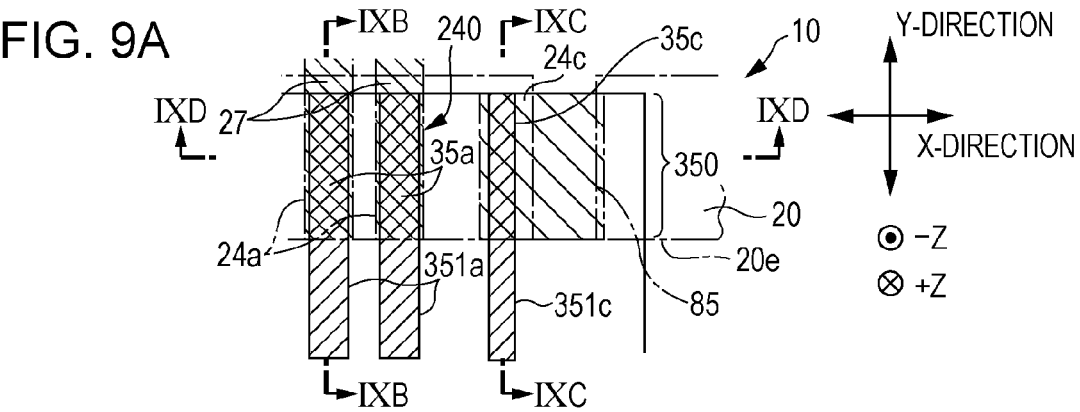
FIGS. 9A to 9D are diagrams illustrating the periphery of a portion of an input device substrate to which a flexible wiring board is mounted in the capacitive input device according to the second embodiment.
Figure 9B:
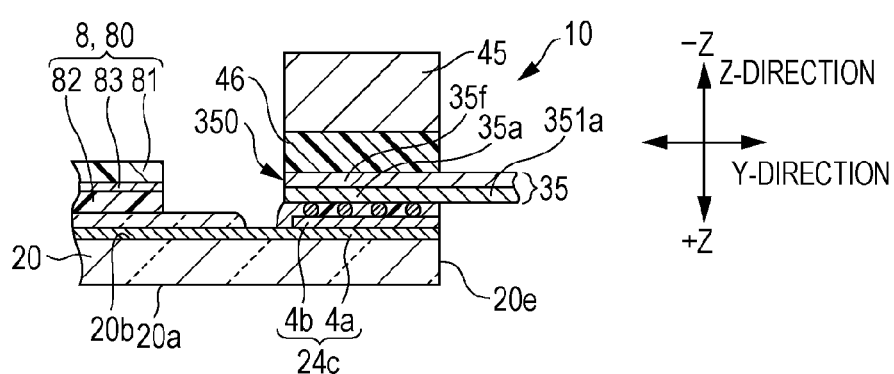
Figure 9C:
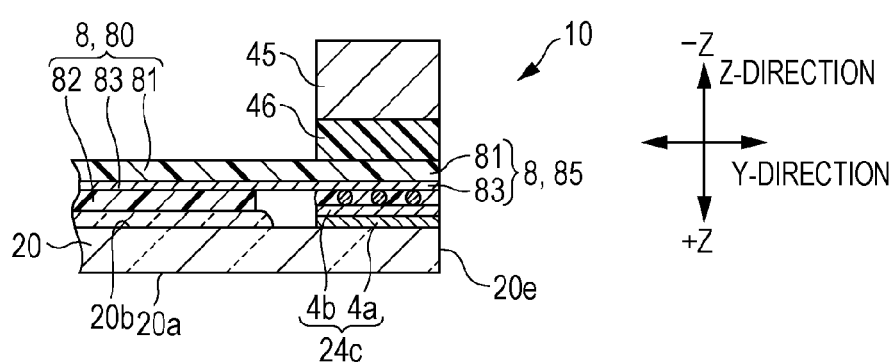
Figure 9D:
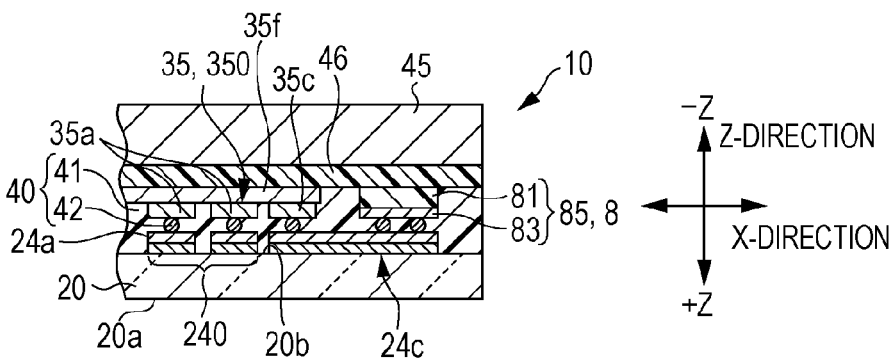

FIGS. 9A to 9D are diagrams illustrating the periphery of a portion of the input device substrate 20 to which the flexible wiring board 35 is mounted in the capacitive input device 1 according to the third embodiment. FIG. 9A is a plan view of a mounting portion of the input device substrate 20, FIG. 9B is a cross-sectional view taken along the line IXB-IXB, FIG. 9C is a cross-sectional view taken along the line IXC-IXC and FIG. 9D is a cross-sectional view taken along the line IXD-IXD. In addition, in FIG. 9A, components of the flexible wiring board 35 are shown by a solid line, components of the input device substrate 20 are shown by a dot-dashed line, and the shielding film 8 is shown by a dot-dot-dashed line.

As illustrated in FIGS. 6A and 6B, FIGS. 7A and 7B, FIGS. 8A to 8C, and FIGS. 9A to 9D, on the second surface 20b of the input device substrate 20, the terminal arrangement region 240 is configured in which a plurality of the position detection mounting terminals 24a are arranged along the end portion 20e. In FIGS. 6A and 6B, FIGS. 7A and 7B, FIG. 8C, and FIGS. 9A to 9D, the flexible wiring board 35 has an overlapping portion 350 which overlaps with the terminal arrangement region 240 of the input device substrate 20 and both side regions thereof. In the overlapping portion 350, terminals 35a are formed in regions overlapping with the position detection mounting terminals 24a.

In this embodiment, as described later with reference to FIGS. 6A and 6B, FIGS. 7A and 7B, FIGS. 8A to 8C, and FIGS. 9A to 9D, the flexible wiring board 35 is used to apply a shield potential to the shield electrode layer 83 of the shielding film 8. Specifically, first, the shielding film 8 includes a main body portion 80 having a large area which overlaps with the second surface 20b of the input device substrate 20 and two protruding portions 85 extending from the main body portion 80 in band shapes.

Here, the main body portion 80 is provided with the adhesive layer 82 and the shield electrode layer 83, and the main body portion 80 is adhered and fixed to the second surface 20b of the input device substrate 20 by the adhesive layer 82. Contrary to this, in the protruding portions 85, the adhesive layer 82 is not formed and the shield electrode layer 83 is exposed. In addition, the two protruding portions 85 overlap with both side regions of the terminal arrangement region 240 of the position detection mounting terminals 24a on the second surface 20b of the input device substrate 20. In this state, the shield electrode layer 83 of the protruding portions 85 is exposed on the side on which the input device substrate 20 is positioned.

In the second surface 20b of the input device substrate 20, shielding mounting terminals 24c are formed in both side regions of the terminal arrangement region 240 of the position detection mounting terminals 24a. In addition, in the protruding portions 85 of the shielding film 8, the shield electrode layer 83 is electrically connected with an anisotropic conductive material 40 while overlapping with the shielding mounting terminal 24c. Here, the protruding portions 85 of the shielding film 8 overlap with only a portion of the shielding mounting terminal 24c, and other portions of the shielding mounting terminal 24c are electrically connected to a terminal 35c of the flexible wiring board 35 with the anisotropic conductive material 40. That is, the flexible wiring board 35 is provided with the terminals 35c in regions overlapping with both side regions of the terminal arrangement region 240 of the position detection mounting terminals 24a, and the terminals 35c are formed only in regions that do not overlap with the protruding portions 85 in the regions overlapping with the shielding mounting terminals 24c of the input device substrate 20. As described above, in this embodiment, the flexible wiring board 35 itself does not overlap with the protruding portions 85. The terminal 35c is made of an end portion of a wiring 351c formed on a base film 35f of the flexible wiring board 35.

Using the input device substrate 20, the flexible wiring board 35, and the shielding film 8 configured as described above, as illustrated in FIGS. 9B, 9C, and 9D, the terminal 35a of the flexible wiring board 35 and the position detection mounting terminal 24a of the input device substrate 20 can be electrically connected to each other with the anisotropic conductive material 40 by performing a mounting process described later. In addition, the terminal 35c of the flexible wiring board 35 and the shielding mounting terminal 24c of the input device substrate 20 can be electrically connected to each other with the anisotropic conductive material 40. Moreover, the shielding mounting terminal 24c of the input device substrate 20 and the shield electrode layer 83 formed in the protruding portions 85 of the shielding film 8 can be electrically connected to each other with the anisotropic conductive material 40.

Production Method and Mounting Process of Capacitive Input Device 1

With reference to FIGS. 7A and 7B and FIGS. 9A to 9D, in a method of producing the capacitive input device 1 according to this embodiment, a process for mounting the flexible wiring board 35 to the input device substrate 20 will be described, and a structure of electrical connection between the shielding film 8 and the flexible wiring board 35 in the capacitive input device 1 according to this embodiment will be described.

In order to produce the capacitive input device 1 according to this embodiment, in the mounting process, first, as illustrated in FIGS. 7A and 9A, the anisotropic conductive material 40 is provided on the terminal arrangement region 240 and both side regions thereof in the second surface 20b of the input device substrate 20.

Next, the main body portion 80 of the shielding film 8 is adhered and fixed to the second surface 20b of the input device substrate 20 by the adhesive layer 82, and the two protruding portions 85 overlap with the shielding mounting terminals 24c of the input device substrate 20.

Next, as illustrated in FIGS. 9B, 9C, and 9D, the end portion (the overlapping portion 350) of the flexible wiring board 35 is overlapped to cover the terminal arrangement region 240 of the input device substrate 20 and the protruding portions 85 via the anisotropic conductive material 40.

Next, the flexible wiring board 35 is pressed against the input device substrate 20 by the pressure-bonding head 45 while heating the flexible wiring board 35. At this time, the pressure-bonding head 45 presses the protruding portions 85 against the input device substrate 20. Here, the elastic member 46 made of a fluororesin-based sheet is inserted between the pressure-bonding head 45 and the flexible wiring board 35 and between the pressure-bonding head 45 and the protruding portions 85. Next, the anisotropic conductive material 40 is solidified so as to allow the flexible wiring board 35 to be fixed to the terminal arrangement region 240 of the input device substrate 20 by the anisotropic conductive material 40, and the protruding portions 85 and the input device substrate 20 are fixed to each other by the anisotropic conductive material 40.

As a result, the terminal 35a of the flexible wiring board 35 and the position detection mounting terminal 24a of the input device substrate 20 can be electrically connected to each other with the anisotropic conductive material 40. In addition, the terminal 35c of the flexible wiring board 35 and the shielding mounting terminal 24c of the input device substrate 20 can be electrically connected to each other with the anisotropic conductive material 40. Moreover, the shielding mounting terminal 24c of the input device substrate 20 and the shield electrode layer 83 formed in the protruding portions 85 of the shielding film 8 can be electrically connected to each other with the anisotropic conductive material. Therefore, the shield potential can be applied to the shield electrode layer 83 from the flexible wiring board 35.

Main Effects of this Embodiment

As described above, even in the capacitive input device 1 and the electro-optical apparatus 100 with an input function according to this embodiment, as in the first embodiment, the input position detection electrode 21 is provided on the reverse side (the second surface 20b side) to the input operation surface side (the first surface 20a side) of the input device substrate 20, so that there is an advantage in that the input device substrate 20 itself can be used as a translucent cover.

In addition, since the shielding film 8 having the shield electrode layer 83 is provided on the second surface 20b side of the input device substrate 20, the input position detection electrode 21 is hardly affected by electromagnetic noise. Here, the shielding film 8 and the input device substrate 20 are bonded to each other by the adhesive layer 82, and the adhesive layer 82 is interposed between the shield electrode layer 83 and the input device substrate 20. The adhesive layer 82 can be easily thickened unlike the surface protection film 26 which is formed in the input device substrate 20 by the deposition method or the coating method, so that the input position detection electrode 21 and the shield electrode layer 83 can be sufficiently separated from each other. Therefore, since capacitance parasitized between the input position detection electrode 21 and the shield electrode layer 83 is small, substantially the same effect as that in the first embodiment, for example, the effect of high sensitivity, can be exhibited.

Other Embodiments

In the above embodiments, the two protruding portions 85 are provided in the shielding film 8. However, the number of the protruding portions 85 may be one, or three or more.

In the above embodiments, the input position detection electrode 21 (the pad portion) is formed by the lower layer side conductive film 4a and the relay electrode 215 is formed by the upper layer side conductive film 4b. However, the input position detection electrode 21 (the pad portion) may be formed by the upper layer side conductive film 4b and the relay electrode 215 may be formed by the lower layer side conductive film 4a.

In addition, in the above embodiments, the liquid crystal device is used as the image generating device 5. However, an organic electroluminescent device may also be used as the image generating device 5. In addition, in an embodiments, the input panel 2 and the electro-optical panel 5a all have rectangular planar shapes. However, they may also have polygonal planar shapes such as a pentagonal shape. Alternatively, the electro-optical panel 5a may have a rectangular planar shape and the input panel 2 may have a polygonal planar shape with a greater size than the electro-optical panel 5a.

Mounting Examples of Electronic Equipments

Figure 10A:
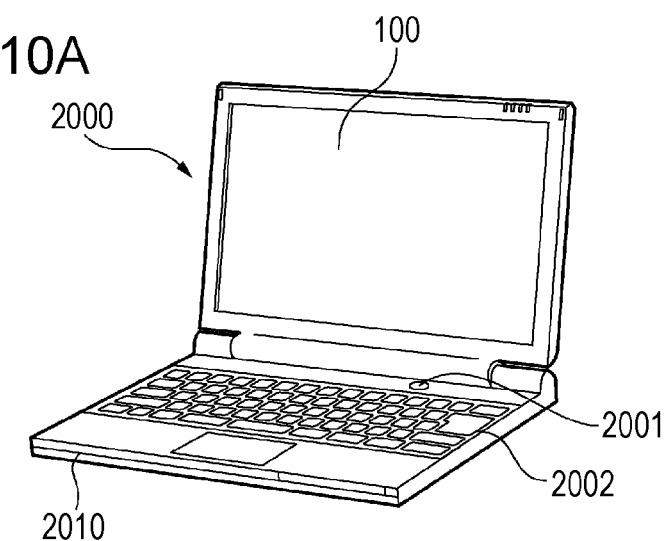
FIGS. 10A to 10C are diagrams illustrating electronic equipment having the electro-optical apparatus with an input function which apply an embodiments of the application.
Figure 10B:
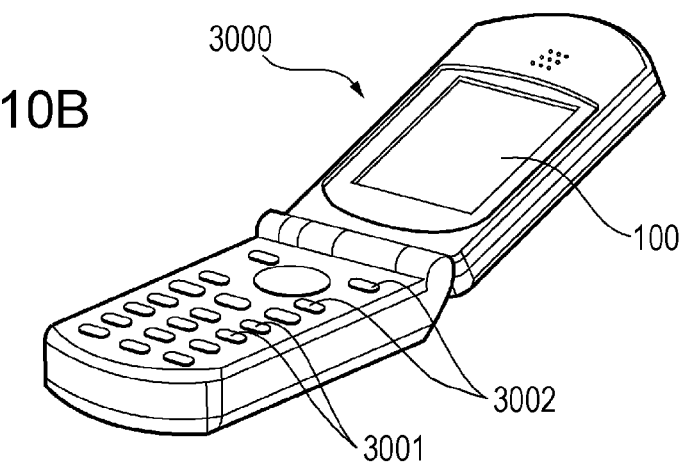
Figure 10C:
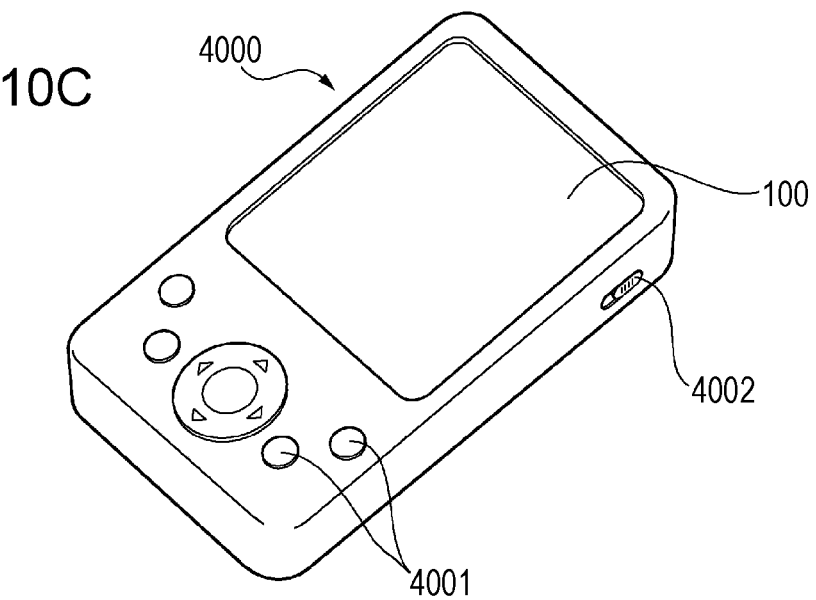

Next, electronic equipment to which is applied the electro-optical apparatus 100 with an input function according to the above embodiments will be described. FIG. 10A illustrates the configuration of a mobile personal computer including the electro-optical apparatus 100 with an input function. The personal computer 2000 includes the electro-optical apparatus 100 with an input function as a display unit and a main body portion 2010. The main body portion 2010 is provided with a power switch 2001 and a keyboard 2002. FIG. 10B illustrates the configuration of a portable phone having the electro-optical apparatus 100 with an input function. The portable phone 3000 includes a plurality of operation buttons 3001, a scroll button 3002, and the electro-optical apparatus 100 with an input function as a display unit. A screen displayed on the electro-optical apparatus 100 with an input function is scrolled by operating the scroll button 3002. FIG. 10C illustrates the configuration of an information portable terminal (Personal Digital Assistant (PDA)) applied with the electro-optical apparatus 100 with an input function. The information portable terminal 4000 includes a plurality of operation buttons 4001, a power switch 4002, and the electro-optical apparatus 100 with an input function as a display unit. When the power switch 4002 is operated, various kinds of information such as an address book, a schedule book, and the like are displayed on the electro-optical apparatus 100 with an input function.

Moreover, as electronic equipment to which is applied the electro-optical apparatus with an input function, in addition to those illustrated in FIGS. 10A to 10C, there are electronic equipment such as digital still cameras, liquid crystal TVs, viewfinder or direct-view video tape recorders, car navigation devices, pagers, electronic organizers, electronic calculators, wordprocessors, workstations, television-phones, POS terminals, and banking terminals. In addition, as display units of such various electronic equipment, the electro-optical apparatus 100 with an input function can be applied.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A capacitive input device comprising:
   an input device substrate having a position detection electrode on a second surface side which is reverse to a first surface side on which an input operation is performed; and
   a shielding film which has a shield electrode layer on a base film and is adhered to the second surface side of the input device substrate by an adhesive layer;
   a flexible wiring board which partially overlaps with the second surface side of the input device substrate, wherein the shielding film includes a main body portion overlapping with an input region where the position detection electrode is formed in the input device substrate;
   a protruding portion protruding from the main body portion toward a position overlapping with the flexible wiring board;
   a portion of the shield electrode layer formed in the protruding portion is electrically connected to the flexible wiring board, and
   wherein a plurality of position detection mounting terminals which are electrically connected to the flexible wiring board are provided on the second surface side of the input device substrate, and
   the shielding film has the protruding portions on both sides with a region where the plurality of the position detection mounting terminals are provided interposed therebetween.

* * * * *